May 6, 1941.  F. J. METZGER  2,241,019
PRODUCTION OF ETHYLENE OXIDE
Filed Jan. 15, 1940
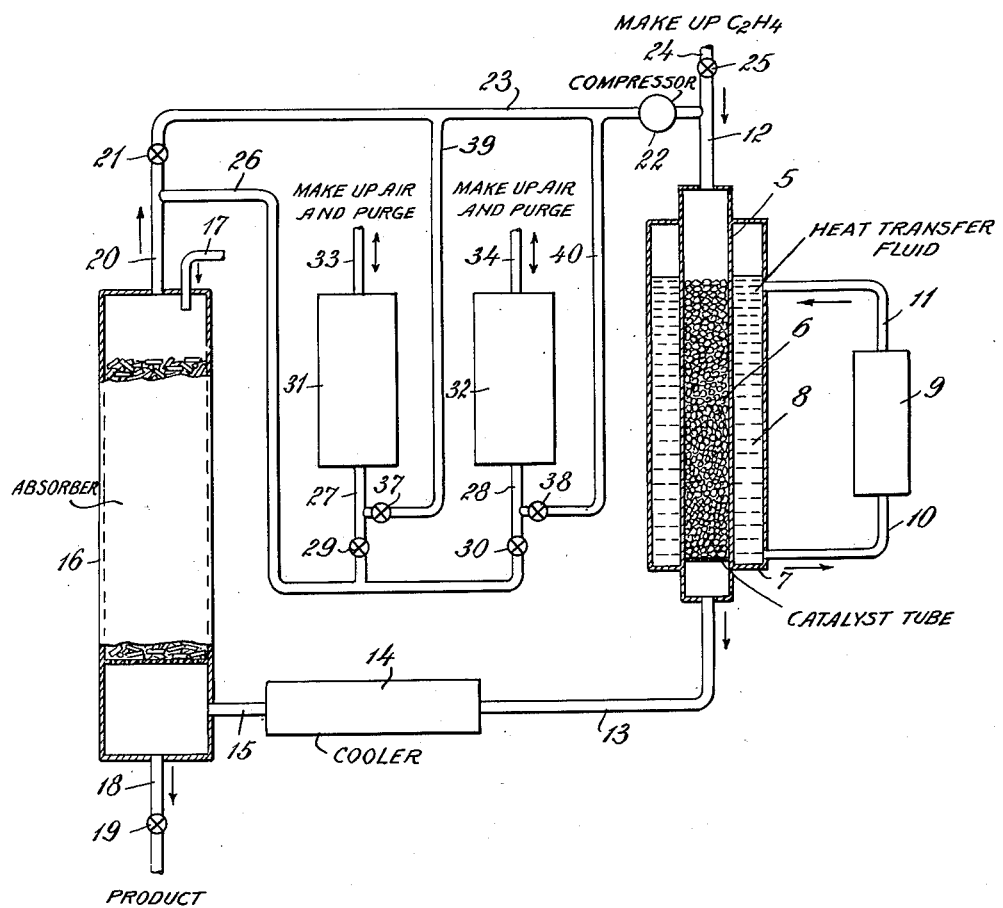
INVENTOR
Floyd J. Metzger
BY
ATTORNEYS Patented May 6, 1941

2,241,019

UNITED STATES PATENT OFFICE 2,241,019

PRODUCTION OF ETHYLENE OXIDE

Floyd J. Metzger, New York, N. Y., assignor, by mesne assignments, to U. S. Industrial Alcohol Co., New York, N. Y., a corporation of West Virginia Application January 15, 1940, Serial No. 313,887

2 Claims. (Cl. 260—348)

This invention relates to the production of ethylene oxide and derivatives therefrom, and particularly to a procedure whereby the efficiency of the operation is materially improved to effect the economic production of ethylene oxide and derivatives therefrom by direct catalytic oxidation of ethylene.

The improvement relates more particularly to the method as described in the patent to Ray M. Carter No. 2,125,333 issued August 2, 1938, in which mixtures of ethylene and air are passed through a tube or tubes containing a suitable catalyst which is maintained at a uniform temperature calculated to promote the reaction within the range, for example, of between 100° and 450° C. The resulting gaseous mixture which may contain from a fraction to one or more per cent of ethylene oxide, is subjected then to suitable treatment, preferably absorption in an absorbing liquid such as water or other solvent. The effluent from the absorber is deficient in oxygen and ethylene but may be recycled to the catalyst with the addition of ethylene and air to maintain concentrations of ethylene and oxygen suitable for the further operation of the method. However, the introduction of air into the cycle tends to increase the nitrogen content of the gas. To avoid building up nitrogen in the cycle, it is necessary to purge continuously a portion of the effluent from the absorber. This purge gas contains, in addition to nitrogen, a quantity of carbon dioxide and also a certain proportion of unreacted ethylene, and the latter constitutes a considerable loss when the reaction is conducted on a large commercial scale.

Consideration of the various operations which might be performed on this purge gas in order to utilize the ethylene contained therein leads to the conclusion that the application of conventional methods would, as a rule, involve costs greater than the value of the ethylene in the gas.

For example, it has been proposed to use the purge gas from a given cycle as all or a part of the feed gas to another cycle, or cycles, carrying out a similar method. However, the additional apparatus required such as pumps, scrubbers, catalytic chambers, and control equipment, and the fact that such additional cycles would necessarily operate with unfavorable gas compositions make this procedure appear uneconomical.

The reconcentration of the ethylene in the purge gas by liquefaction which requires extreme compression or refrigeration to a very low temperature or a combination of these steps is economically impractical since the volume of inert gas to be treated is very large and the ethylene content of the gas is of the order of only 1 or 2% by volume.

In a similar manner reconcentration of the ethylene present in the purge gas by conventional methods using absorbents either liquid or solid is out of the question. In the operation of these methods large quantities of absorbent material would be required for the absorption of the ethylene, consequently extremely large quantities of heat would have to be added to, and then withdrawn, from the absorbent either at frequent intervals or continuously as the case may be. The cost of supplying the heating and cooling materials, and the apparatus for the transfer of the heat, would again make the use of these methods uneconomical.

Theoretically the volume of the purge gas can be greatly reduced by using pure oxygen in place of air to enrich the cycle gas in oxygen. This would then reduce the amount of ethylene in the purge gases to a negligible value. However, since relatively much more oxygen is consumed by unavoidable side reactions than is required for the production of the ethylene oxide itself, the quantity to be supplied is so large that its cost would again be greater than the value of the ethylene in the gases purged when air is used as the source of oxygen.

It is the object of the present invention to provide a method of operation of the cycle gases passing to and from the reaction zone, that will allow the use of air as the source of oxygen for enriching the cycle gas in oxygen, and at the same time insure substantially complete utilization of the ethylene supplied to the cycle under conditions most favorable for the production of ethylene oxide.

Other objects and advantages of the invention will be apparent as it is better understood by reference to the following specification and the accompanying drawing, which illustrates diagrammatically a flow sheet including apparatus adapted for the practice of the invention, it being understood that details are omitted in order that the illustration may be simplified and the operation thus readily understood.

According to this invention, the major portion of the ethylene present in the purge gas is transferred to the incoming air, which is introduced to afford the oxygen necessary for the reaction, permitting the nitrogen and all the carbon dioxide to escape from the cycle. The transfer of the ethylene is accomplished without any attempt to concentrate it, that is to say, the proportion thereof in the entering air is relatively low, but it is nevertheless returned to the cycle with the entering air so that it again enters the catalyst chamber with the re-cycled effluent and the make-up ethylene which is also introduced to maintain the desired proportions of ethylene and oxygen in the gaseous mixture undergoing reaction. The efficiency of the operation is materially increased by thus avoiding otherwise inevitable losses of ethylene from the system.

The invention is not limited to any particular type of apparatus nor to details of procedure such as the catalyst employed or the specific conditions of operation. It will be described more particularly with reference to the practice of the method as set forth in the Carter Patent No. 2,125,333, with the understanding that modifications in that procedure are within the scope of the present invention.

In carrying out the invention, the purge gas, which normally is discharged to the atmosphere, is carried through and in contact with a body of a suitable adsorptive agent such as activated carbon, silica gel, or similar adsorptive or absorptive material, whether solid or liquid, which is adapted to adsorb selectively the ethylene content of the purge gas, while the nitrogen, which constitutes the major portion of this gas, and much of the carbon dioxide present therein, pass through the adsorption agent and are discharged to the atmosphere. Examples of liquid absorbents are oils, ketones, esters or ethers such as "Cellosolve" and other liquid absorbents such as alcohols and hydrocarbons and aqueous solvents such as ammoniacal copper chloride or silver nitrate, which show selective absorption of ethylene. After a suitable period, preferably that at which the adsorption agent approaches saturation with respect to the ethylene removed from the purge gas, the flow of the latter is stopped, and air, preferably at atmospheric temperature, is drawn through the adsorption agent and delivered at a pressure comparable with that of the re-cycled effluent and with the addition of make-up ethylene to the catalyst chamber.

Conveniently two bodies of the adsorption agent may be provided, so that the purge gas may be directed alternately through these bodies while air is directed through the body of adsorption agent which is already more or less saturated with ethylene. The direction of the purge gas and the air through the respective bodies of adsorption agent may be effected periodically and automatically by the provision of suitable mechanism to effect the control and operation of the valves at proper intervals. In this manner, the entering air, which affords the oxygen necessary for the reaction, is enriched in ethylene which is transferred thereto from the purge gas without substantial loss. The air carries the ethylene into the cycle, and hence nearly all of the ethylene entering the cycle passes cyclically through the catalyst until it is converted into ethylene oxide or other products, while the nitrogen and carbon dioxide are continuously purged from the cycle and the desired composition of the gaseous mixture in the catalyst chamber is maintained.

Referring to the drawing, 5 indicates a tubular chamber adapted to receive the catalyst 6. The chamber 5 is surrounded by a jacket 7 adapted to maintain a body 8 of heat transfer fluid which is constantly withdrawn and circulated through an apparatus 9, and there heated or cooled, by means of pipes 10 and 11, which deliver the fluid to and from the jacket. The temperature is maintained preferably within the range of 100° to 450° C., heat being withdrawn or added to the fluid as may be necessary.

The gaseous mixture for reaction is introduced through a pipe 12 and passes downwardly through the body of catalyst. It is withdrawn through a pipe 13, delivered to a cooler 14, and thence through a pipe 15 to an absorber 16. The absorber 16 is a column which may be filled with any suitable packing or trays to facilitate breaking up the absorbing liquid to afford the maximum possible surface contact with the gaseous mixture. The absorbing liquid may be water or other suitable solvent. This liquid is supplied through a pipe 17. The liquid is withdrawn through a pipe 18 controlled by a valve 19 carrying the ethylene oxide product of the operation. The unabsorbed gaseous mixture constituting the effluent escapes through a pipe 20 controlled by a valve 21. It is recompressed by a compressor 22 to a pressure sufficient to ensure proper circulation through the system. A pressure of 15 pounds or upward is usually sufficient. Higher pressures may be used, but pressures materially above those necessary to maintain circulation are not generally desirable and do not materially increase the efficiency of the reaction. From the compressor 22, the major part of the effluent passes through a pipe 23 to the pipe 12. An additional quantity of ethylene, sufficient to maintain the desired proportion in the gaseous mixture entering the catalyst, is introduced through a pipe 24 controlled by a valve 25.

A part of the effluent from the pipe 20 is withdrawn through a pipe 26 and is delivered alternately through pipes 27 and 28 controlled by valves 29 and 30 to chambers 31 and 32. The latter chambers are filled with suitable adsorptive material such as activated carbon, silica gel, or the like, or a suitable liquid absorbent, adapted to adsorb and hold the ethylene content of the purge gas, permitting escape of nitrogen and carbon dioxide through pipes 33 and 34. While the purge gas is passing through one of the chambers 31 and 32, air, preferably at or near the temperature of the absorbent, is introduced to the other chamber 31 or 32, as the case may be. The introduction of the air is controlled by the compressor 22 and valves 37 and 38, and the air is delivered through pipes 39 and 40 to the pipe 23.

Thus, while the purge gas is passing through the left-hand chamber 31 and escaping through the pipe 33, the valves 29 and 38 being open while the valves 30 and 37 are closed, air will be drawn through the chamber 32 in which the adsorption agent is already substantially saturated with ethylene. The air flushes the ethylene from the adsorption agent and it is thus transferred to the air, which is delivered through the pipe 40 to the pipe 23, and thus mingled with the gaseous mixture which is being cycled through the system.

At the end of this phase of the operation, the valves 29 and 38 are closed, and the valves 30 and 37 are opened, thus reversing the operation. Conveniently the valves 29, 30, 37 and 38 may be actuated in unison through suitable time-controlling mechanism, forming no part of the invention, and consequently not illustrated, which automatically reverses the valves at stated intervals to direct the passage of the purge gas and the entering air in the proper directions through the system. In the manner indicated, the ethylene in the purge gas may be retained and transferred to the entering air, and substantially all of the ethylene entering the system as make-up ethylene through the pipe 24 and valve 25 is retained in the system until it is oxidized and the ethylene oxide formed is recovered in the absorber 16.

As previously indicated, the invention does not depend upon the use of any particular catalyst. It is preferable to employ a catalyst consisting of a ceramically bonded fused aluminum oxide such as "Alundum," on which silver has been deposited as described in the Carter Patent No. 2,125,333. Other carriers such as artificial silica filter stone, etc., may be utilized. The use of ceramically bonded fused aluminum oxide is preferable, because it has been found that aluminum oxide in which 10% of clay (principally aluminum silicate) has been bonded, affords a very satisfactory support for the silver catalyst. The silver on the catalyst may constitute 10% by weight of the carrier. It is, however, practicable to use greater or lesser quantities of silver in the catalyst, for example, from 1 to 50% by weight of the finished catalyst, depending upon the character and porosity of the carrier.

The catalyst is broken into fragments of suitable dimensions, roughly ⅜ by ½ inch, but other sizes may be used. The method of depositing the silver on the catalyst is well known, and is described in the Carter Patent No. 2,125,333. Consequently, further description of the preparation of the catalyst, which forms no part of the present invention, is unnecessary.

As hereinbefore indicated, the reaction may be conducted at a pressure sufficient only to ensure travel of the gaseous mixture through the catalyst. As an example of practical operation, I employed as a catalyst chamber a tube having an internal diameter of 1½ inches and a length of 26 feet. 24 feet of the tube were filled with the catalyst prepared as hereinbefore described. The temperature of the jacket surrounding this tube was 298° C. The method was operated by cycling the gaseous mixture at the rate of 180 cubic feet per hour. To this was added 63 cubic feet of air per hour, and 3.90 cubic feet of ethylene per hour. The ethylene oxide produced per hour was 2.42 cubic feet, or in other words 62.0% of the ethylene entering the system was converted into ethylene oxide by the cycle. Since substantially all of the ethylene entering the cycle is retained therein in accordance with the present invention, substantially all of it is eventually consumed, being converted either to ethylene oxide or other products.

The same system when operated in the usual manner so as to obtain the same production of ethylene oxide but without the benefit of the present invention required a feed of 5.1 cubic feet of ethylene per hour to give 2.40 cubic feet per hour of ethylene oxide. Under these conditions only 46.8% of the ethylene feed was converted to ethylene oxide, the balance being either converted to other products or lost.

It is seen that the application of the present invention to this process may increase the overall yield of the conversion cycle from 46.8% to 62.0%, an improvement of about 32 parts per hundred. On a commercial scale such an improvement may well represent the difference between the ultimate success or failure of a process. In this case it can be attributed only to the improved method of enriching the cycle gas in oxygen as described above.

The details of the apparatus as described and of the procedure as set forth may be modified without departing from the invention or sacrificing any of the advantages thereof.

I claim:

1. The method of increasing the efficiency of the cyclic method of oxidizing ethylene catalytically which comprises directing a gaseous mixture containing ethylene and oxygen over a catalyst, separating the resulting ethylene oxide from the gaseous mixture, selectively absorbing ethylene from the portion of the residual gaseous mixture which is not cycled, purging the gas from which ethylene was selectively absorbed, adding make-up ethylene and air to the cycled gaseous mixture, and flushing the absorbed ethylene with the air to be added to the cycled gaseous mixture to transfer to said air the absorbed ethylene.

2. The method of increasing the efficiency of the cyclic method of oxidizing ethylene which comprises directing a gaseous mixture containing ethylene and oxygen through a reaction zone in which ethylene oxide is formed, separating the resulting ethylene oxide from the gaseous mixture, selectively absorbing ethylene from the portion of the residual gaseous mixture which is not cycled, purging the gas from which ethylene was selectively absorbed, adding make-up ethylene and air to the cycled gaseous mixture, and flushing the absorbed ethylene with the air to be added to the cycled gaseous mixture to transfer to said air the absorbed ethylene.

FLOYD J. METZGER.